United States Patent
Aumasson

(10) Patent No.: US 12,010,507 B2
(45) Date of Patent: Jun. 11, 2024

(54) SECURE BEACONS

(71) Applicant: NAGRAVISION SARL, Cheseaux-sur-Lausanne (CH)

(72) Inventor: Jean-Philippe Aumasson, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 319 days.

(21) Appl. No.: 17/296,580

(22) PCT Filed: Nov. 29, 2019

(86) PCT No.: PCT/EP2019/083122
§ 371 (c)(1),
(2) Date: May 25, 2021

(87) PCT Pub. No.: WO2020/109569
PCT Pub. Date: Jun. 4, 2020

(65) Prior Publication Data
US 2021/0400472 A1   Dec. 23, 2021

(30) Foreign Application Priority Data
Nov. 29, 2018   (EP) .................................... 18209059

(51) Int. Cl.
H04W 12/03   (2021.01)
H04L 9/06    (2006.01)
(Continued)

(52) U.S. Cl.
CPC ........... *H04W 12/03* (2021.01); *H04L 9/0631* (2013.01); *H04L 9/3242* (2013.01); *H04W 4/80* (2018.02); *H04W 12/06* (2013.01)

(58) Field of Classification Search
CPC ....... H04W 12/03; H04W 4/80; H04W 12/06; H04L 9/0631
See application file for complete search history.

(56) References Cited

U.S. PATENT DOCUMENTS 9,510,201 B1* 11/2016 Shimoon ............... H04W 12/06
9,603,013 B2*  3/2017 Niewczas ............. H04W 12/04
(Continued)

FOREIGN PATENT DOCUMENTS

WO   2013/126747 A2   8/2013
WO   2017/064361 A1   4/2017

*Primary Examiner* — Viral S Lakhia
(74) *Attorney, Agent, or Firm* — POLSINELLI LLP

(57) ABSTRACT

A method for securing a beacon signal in a network comprising a transmitter for broadcasting the beacon signal and one or more receivers for receiving the beacon signal, wherein the beacon signal comprises a data packet (103) including a payload (106) that comprises a first field containing broadcast information from the transmitter and a second field (204) for storing authentication information, the method comprising: computing, using a secret key, a message authentication code over the payload; extracting bytes from the message authentication code to obtain the authentication information; and encrypting the first field using a symmetric cipher which takes as parameter the secret key and a nonce, wherein the nonce comprises the authentication information, the encrypting resulting in an encrypted first field, the resulting secure beacon signal (200) comprising the encrypted first field (203) and the second field (204) with the authentication information.

14 Claims, 4 Drawing Sheets

(51) Int. Cl.
  *H04L 9/32* (2006.01)
  *H04W 4/80* (2018.01)
  *H04W 12/06* (2021.01)

(56) References Cited

U.S. PATENT DOCUMENTS

| | | | |
|---|---|---|---|
| 10,064,008 B2* | 8/2018 | Park | H04W 40/244 |
| 10,129,746 B2* | 11/2018 | Lee | G06F 3/04842 |
| 10,349,220 B2* | 7/2019 | Yamaguchi | B60R 25/24 |
| 10,477,456 B2* | 11/2019 | Yoshimura | H04W 48/12 |
| 10,555,257 B2* | 2/2020 | Yang | H04W 52/0216 |
| 10,715,528 B1* | 7/2020 | Leblang | H04W 4/02 |
| 11,244,355 B2* | 2/2022 | Walden | G06Q 30/0252 |
| 2005/0054327 A1* | 3/2005 | Johnston | H04L 63/0869 |
| | | | 455/410 |
| 2016/0026826 A1* | 1/2016 | Kocher | H04L 9/088 |
| | | | 713/1 |
| 2017/0070847 A1* | 3/2017 | Altman | H04W 4/80 |
| 2019/0297495 A1* | 9/2019 | Aggarwal | H04L 9/083 |
| 2021/0067329 A1* | 3/2021 | Coyle | H04L 9/0891 |

\* cited by examiner

SECURE BEACONS

TECHNICAL FIELD

The present disclosure relates to a computer-implemented method for securing a beacon signal, a computer-implemented method for processing a received secure beacon signal, a transmitter configured for securing a beacon signal, a receiver configured for processing a received secure beacon signal, and a secure beacon signal.

BACKGROUND ART

Bluetooth Low-Energy (BLE), as defined in the Bluetooth 4.0 and subsequent standard versions, supports the broadcast transmission of beacons, which are small packets of data typically aimed to inform a receiver of a tag's presence. Typically, the beacon includes the identifier of the tag. Such tags transmitting beacons are for example used in supply chain applications, to track items, containers, et cetera.

Broadcast beacons are typically sent in clear, i.e. without encryption or authentication mechanisms. An attacker can therefore create and transmit such beacon in order to impersonate a tag. In comparison, Bluetooth communications that use a pairing mechanism as opposed to broadcast communications, can use Bluetooth-standardized authenticated encryption.

FIG. 1 shows a broadcast network 10, including two transmitters 1a, 1b, such as Bluetooth tags. The arrows from the transmitters 1a, 1b depict broadcast signals. The receiver 3 receives a broadcast signal, depicted by the arrow towards the receive 3. An attacker device 2 may pick up the broadcast signal and impersonate a legitimate tag by transmitting the broadcast signal again, possibly in an altered form. FIG. 1 also shows a remote network 4, to which the device 3 may be communicatively connected.

It is generally considered problematic that beacon signals can be impersonated and misused. There is a need for secure broadcast beacons in order to prevent spoofing of beacons and/or protect the confidentiality and integrity of the data transmitted in the beacon signal.

SUMMARY

According to an aspect of the disclosure, a computer-implemented method is proposed for securing a beacon signal in a network comprising a transmitter for broadcasting the beacon signal and one or more receivers for receiving the beacon signal. The beacon signal can comprise a data packet. The data packet can include a payload. The payload can comprise a first field containing broadcast information from the transmitter and a second field for storing authentication information. The method can comprise computing—by using a secret key—a message authentication code over at least a part of the payload. The method can further comprise extracting a predefined number of bytes from the message authentication code to obtain the authentication information. The number of bytes can be equal to or less than the length of the second field. The method can further comprise encrypting at least part of the first field using a symmetric cipher which takes as parameter the secret key and a nonce. The nonce can comprise the authentication information. The encrypting procedure can result in an encrypted first field. The resulting secure beacon signal can comprise the data packet, wherein the payload comprises the encrypted first field and the second field contains the authentication information.

Advantageously, the thus obtained secured beacon signal is both encrypted and includes authentication information. The secured beacon signal can be decrypted and authenticated by the receiver to ensure its authenticity.

Typically, the second field comprises one or more unused fields of a payload and/or a header of a data packet. One or more unused fields may be used for storing the authentication information. The authentication information may be stored in a single unused field or different parts of the authentication information may be stored in different unused fields. It is possible to use a portion of an unused field. An unused field may be one or more bits long.

In an embodiment the symmetric cipher can be a length-preserving symmetric cipher which takes as parameter the secret key and the nonce.

In an embodiment the data packet can further comprise a sequence number field for storing a sequence number, wherein the sequence number can be incremented for each new beacon signal transmitted by the transmitter, and wherein the nonce can be based on the authentication information and the sequence number, the nonce preferably comprising a concatenation of the authentication information and the sequence number and padded with zeros to obtain the nonce having a predetermined length.

In an embodiment the data packet can further comprise an identification field containing an identifier of the transmitter. The secret key can be associated with the identifier of the transmitter.

The secured beacon signal may be used in various network technologies, such as WAN communication technologies such as LoRaWAN, Sigfox and NB-IoT. In an embodiment the data packet can be a Bluetooth Low-Energy advertising packet data unit.

According to an aspect of the disclosure, a computer-implemented method is proposed for processing a received secure beacon signal in a network comprising a transmitter for broadcasting the secure beacon signal and one or more receivers for receiving the secure beacon signal. The secure beacon signal can comprise a data packet. The data packet can include a payload. The payload can comprise a first field comprising encrypted broadcast information and a second field containing authentication information. The method can comprise receiving the secure beacon signal in a receiver. The method can further comprise decrypting the encrypted first field using a symmetric cipher which takes as parameter a secret key and a nonce. The nonce can comprise the authentication information, the decrypting resulting in a decrypted first field In an embodiment the symmetric cipher can be a length-preserving symmetric cipher which takes as parameter the secret key and the nonce.

In an embodiment the data packet can further comprises a sequence number field comprising a sequence number. The nonce can be based on the authentication information and the sequence number, the nonce preferably comprising a concatenation of the authentication information and the sequence number and padded with zeros to obtain the nonce having a predetermined length.

In an embodiment the data packet can further comprise an identification field containing an identifier of the transmitter. The secret key can be associated to the identifier of the transmitter. The method can further comprise obtaining the secret key based on the identifier.

In an embodiment the method can further comprise computing a message authentication code over at least a part of the payload after decrypting, and using the secret key. The method can further comprise extracting a predefined number of bytes from the message authentication code to obtain further authentication information. The number of bytes can be equal to or less than the length of the second field. The method can further comprise comparing the further authentication information with the authentication information to verify an authenticity of the data packet.

In an embodiment the second field can be set to a predetermined value other than the authentication information before computing the message authentication code, the predetermined value preferably being zero.

The secured beacon signal may be used in various network technologies, such as WAN communication technologies such as LoRaWAN, Sigfox and NB-IoT. In an embodiment the data packet can be a Bluetooth Low-Energy advertising packet data unit.

According to an aspect of the disclosure, a transmitter is proposed that is configured for securing a beacon signal. The transmitter can comprise a processor configured to perform one or more of the above described steps for securing a beacon signal. The transmitter can include an antenna for broadcasting the secure beacon signal to one or more receivers.

According to an aspect of the disclosure, a receiver is proposed that is configured for processing a received secure beacon signal. The receiver can comprise an antenna for receiving the secure beacon signal broadcast from a transmitter. The receiver can further comprise a processor configured to perform one or more of the above described steps for processing a received secure beacon signal.

According to an aspect of the disclosure, a secure beacon signal is proposed that comprises a data packet, the data packet including a payload, wherein the payload comprises an encrypted first field containing broadcast information from a transmitter and a second field containing authentication information, wherein at least a part of the first field is encrypted, and wherein the secure beacon signal has been generated according to one or more of the above described steps for securing a beacon signal.

Hereinafter, embodiments of the disclosure will be described in further detail. It should be appreciated, however, that these embodiments may not be construed as limiting the scope of protection for the present disclosure.

BRIEF DESCRIPTION OF DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

In the following examples a beacon in the form of a Bluetooth Low-Energy (BLE) advertising packet data unit (PDU), as defined in the Bluetooth Specification 4.0 and subsequent versions of the Bluetooth standard, will be discussed. The disclosure is not limited to BLE and may be applied to other type of beacons.

When a BLE peripheral device broadcasts packets to every device around it, this is called BLE advertising. The receiving device can act on the received advertised information or be triggered by the advertisement to connect to the BLE peripheral device to receive more information. Principally BLE advertising is unidirectional.

The 2.4 GHz spectrum for Bluetooth extends from 2402 MHz to 2480 MHz. BLE uses 40 1 MHz wide channels, numbered 0 to 39. Each is separated by 2 MHz. Channels 37, 38, and 39 are used for sending advertisement packets.

BLE advertisements are transmitted at a fixed interval from 20 ms to 10.24 seconds, in steps of 0.625 ms, possibly with a random delay. The random delay may be a pseudo-random value from 0ms to 10 ms that is automatically added. This randomness may help reduce the possibility of collisions between advertisements of different devices.

Figure 2:
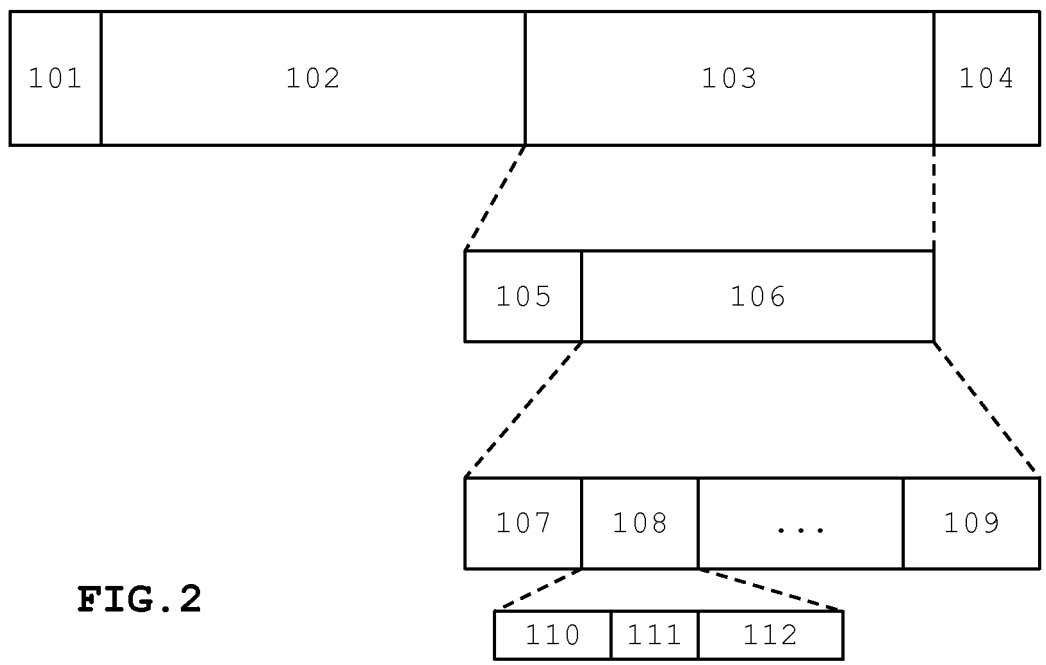
FIG. 2 shows a packet data format of a Bluetooth Low Energy data packet.

FIG. 2 shows the packet data format of a BLE data packet. The BLE data packet has several parts including a preamble 101, an access address 102, a packet data unit (PDU) 103 and a CRC 104. The advertisement channel PDU 103 includes a 2-byte header 105 and a variable payload 106 of 6 to 37 bytes. The actual length of the payload is defined by a 6-bit length field in the header 105 of the advertising channel PDU 103.

The header 105 further includes a 4 bits PDU type indicator. There are several PDU types for the advertisements, including ADV_IND having a PDU type of "0000", ADV_NONCONN_IND having a PDU type of "0010" and ADV_SCAN_IND having a PDU type of "0110". ADV_IND is a generic advertisement and usually the most common. It's generic in that it is not directed and it is connectable: this means that a device can connect to the peripheral that is advertising, and it is not directed towards a particular device. When a peripheral device sends an ADV_IND advertisements, it may be detected by devices such as smartphones or any other Bluetooth capable device. Once found, a device may begin a connection process, display information from the advertisement or act in any other manner based on the advertised information. ADV_NONCONN_IND is an advertisement type used when the peripheral does not want to accept connections, which is typical in beacons.

The advertisement channel PDU 103 has an advertising payload 106 that depends on the advertising PDU type. FIG. 2 shows the ADV_IND payload. This payload has an advertisement address 107 of 6 bytes and a variable number of advertisement data structures 108 . . . 109. The advertisement address 107 is typically referred to as the Bluetooth MAC Address although another address may be used. The advertisement payload 108 . . . 109 has a maximum of 31 bytes for actual advertisement data structures. Each advertisement data structure typically includes a length field 110, type field 111, and data field 112. By using a data type of 0xFF in the type field 111, the Bluetooth Standard allows for manufacturer specific data to be broadcast, giving the possibility of custom payload.

Figure 3:
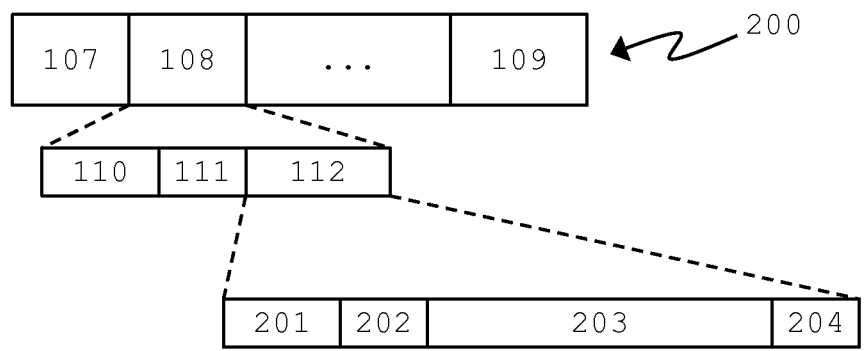
FIG. 3 shows a secure beacon data format of an exemplary embodiment.

The present disclosure enables the payload of a beacon, such as the BLE advertisement, to be encrypted, resulting in a secure beacon 200, such as shown in FIG. 3. Advantageously, the payload of the secure beacon can be of the same size as the clear beacon to not interfere with the original BLE advertising scheme. Normally, overhead is created when encrypting a data packet, for example to encode a nonce—e.g. initial value, or IV—and to append an authentication tag, generated by a message authenticated code or by an authenticated cipher. The secure beacon 200 is special in that it can add cryptographic protection to the advertisement payload 108 without adding overhead to the packet, as will be explained in more detail.

In the example of FIG. 3 the advertising payload 108 is encrypted. In case the beacon includes multiple advertising payloads, for example also advertising payload 109, one or more of the advertising payloads 108 . . . 109 may be encrypted.

The advertising payload 108 may include a number of further fields 201-204. The order of the further fields may be varied and there may be less or more further fields. The secure beacon 200 may include a field 201 for storing a sequence number, which may be incremented for each new beacon sent by a tag. The secure beacon may further include a field 202 for storing a tag's ID. Preferably, the tag ID is a unique parameter, shared with the receiver of the beacon signal. Possibly the receiver is a remote server, depending on the system's architecture. The secure beacon further includes a second field for storing authentication information. In this example the second field is a field 204 of U bytes of unused data, where U is preferably at least equal to 4. A first field, in this example the field 203, contains the actual beacon information. In an alternative embodiment, not shown, the sequence number field 201 and/or the tag ID field 202 may be stored in another part of the advertisement beacon, such as in the header 105.

A beacon is transformed into a secure beacon in two steps, using a secret key K. Preferably the secret key K is at least 16 bytes in length. In a first step a message authentication code (e.g. an ISO/IEC 9797-2 based MAC) may be computed over the advertising payload 108. Hereto, B bytes of the advertising payload 108, possibly all 31 bytes in case there are no other advertising payloads, is computed. Thus, MAC(K,B) may be calculated. Before the first step the field 204 contained a predefined value, preferably U bytes of zero ("0000" in case U equals 4).

It is to be understood that the term 'message authentication code' is not limited to an ISO/IEC 9797-2 or similar MAC. For example, the message authentication code may be a deterministically computed pseudo random value that takes as parameters one or more fields from the packet, a unique identifier of the device, and a shared secret value. This may enable good protection in case any of these parameters are exposed to an attacker or in case the system is based on using a global key.

U bytes may be extracted from the calculated MAC. This may be any predefined U bytes, for example the first four bytes of the calculated MAC. These U bytes from the calculated MAC are copied to the field 204 of the beacon.

In a second step the beacon may be encrypted. Hereto, the U bytes from the MAC and the beacon's sequence number may be combined to form a nonce. This combination may be made in any mathematical manner, for example by concatenating the U bytes from the MAC and sequence number. The result may be padded with zeroes to form a nonce of predefined length. The nonce may then be used to encrypt selected fields of the beacon, such as the information field 203. Alternatively or additionally, other advertising payloads such as advertising payload 109 or part thereof may be encrypted using the nonce. Preferably, a length-preserving symmetric cipher is used for encrypting the selected fields, such as AES-CTR, which takes as parameter the secret key K and the nonce. Fields to be encrypted may be any fields of the beacon, except for the sequence number field 201, the tag ID field 202, and the U bytes from the MAC in field 204. When the selected fields have been encrypted, the secure beacon is formed and ready for broadcast.

When using AES, power consumption may be minimized by using a modified version of the AES block algorithm that performs seven instead of ten rounds (in its 128-mode) to get a 30% speed-up.

When the receiver receives the secure beacon, the secure beacon may be decoded to obtain the beacon information. Decoding of the secure beacon includes a decryption step, possibly followed by authenticity verification.

For decrypting the secure beacon, the tag's ID may be read from the tag ID field 202. The receiver may be configured to obtain the cryptographic key K associated to the tag ID, e.g. from an internal lookup table or from a remote server. Next, the nonce may be reconstructed by concatenating the U bytes from the MAC received in field 204 and the sequence number received in field 201. Using the key K and the nonce, the encrypted fields may be decrypted.

The authenticity of the decrypted beacon may be verified as follows. From the decrypted beacon, the U bytes from the MAC may be read from the field 204 and thereafter field 204 may be set to the predefined value, such as U bytes of zero ("0000" in case U equals 4). The message authentication code may be calculated using the key K over the B bytes of the advertising payload 108, resulting in $MAC_{verification}(K, B)$. U bytes may be extracted from the calculated $MAC_{verification}(K,B)$, from the same byte locations as in the authentication step described above. The U bytes from the calculated $MAC_{verification}(K,B)$ may be compared with the U bytes from the MAC obtained from the received secure beacon. If the values match, the secure beacon may be considered authentic. If the values don't match, the tag may be rejected as invalid and the decrypted content may be discarded.

Instead of using one or more unused portions of the payload 106, such as field 204 in the example of FIG. 3, the second field for storing authentication information may be part of the header 105. The header 105 may include one or more unused fields, such as a field reserved for future use (RFU). For example, the header of a Bluetooth low energy data packet typically includes a sequence of a 4 bits PDU type field, a 2 bits RFU field, a 1 bit TxAdd field, a 1 bit RxAdd field, a 6 bits Length field and a 6 bits further RFU field. The authentication information, such as the MAC in the example of FIG. 3, may be copied to an RFU field. Different parts of the authentication information may be copied to different RFU fields.

Alternatively, one or more unused fields in the payload 106, such as field 204, and one or more unused fields in the header 105, such as the RFU fields, may be used together to store different parts of the authentication information.

Figure 4:
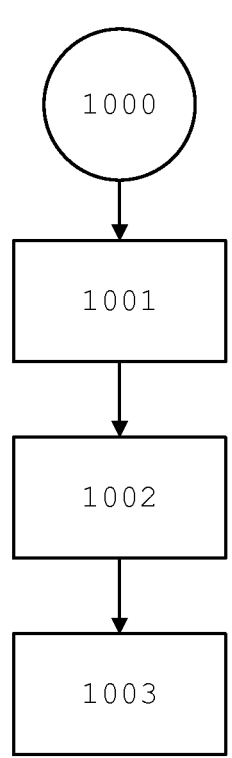
FIG. 4 shows a flow chart of an exemplary method for securing a beacon signal.

FIG. 4 shows a flow chart of an exemplary method for securing a beacon signal 1000. In step 1001 a message authentication code may be computed over at least a part of the payload using a secret key. In step 1002 a predefined number of bytes may be extracted from the message authentication code to obtain the authentication information, the number of bytes being equal to or less than the length of the second field. In step 1003 at least part of the first field may be encrypted using a symmetric cipher which takes as parameter the secret key and a nonce, wherein the nonce comprises the authentication information. The encrypting may result in an encrypted first field and the resulting secure beacon signal 200 may comprise the data packet, wherein the payload comprises the encrypted first field 203 and the second field—for example field 204 and/or one or more unused fields of the header 105—contains the authentication information.

Figure 5:
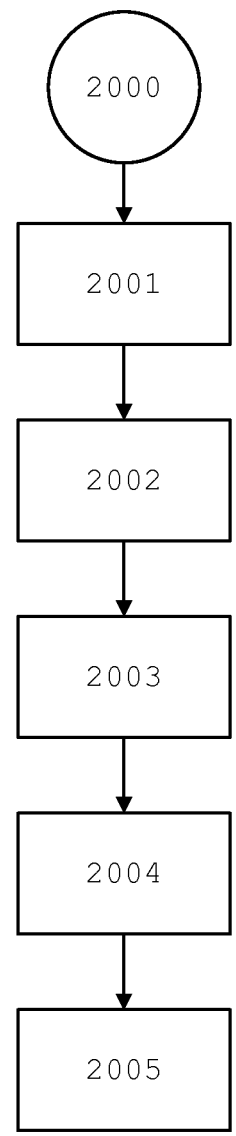
FIG. 5 shows a flow chart of an exemplary method for processing a received secure beacon signal.

FIG. 5 shows a flow chart of an exemplary method for processing a received secure beacon signal. In step 2000 the secure beacon signal may be received in a receiver. In step 2002 the encrypted first field may be decrypted using a symmetric cipher which may take as parameter a secret key and a nonce. The nonce may comprise the authentication information obtained from the secure beacon signal in step 2001. The decrypting may result in a decrypted first field. In step 2003 a message authentication code may be computed over at least a part of the payload after decrypting, and using the secret key. In step 2004 a predefined number of bytes may be extracted from the message authentication code to obtain further authentication information. The number of bytes is equal to or less than the length of the second field. In step 2005 the further authentication information is compared with the authentication information to verify an authenticity of the data packet.

Figure 1:
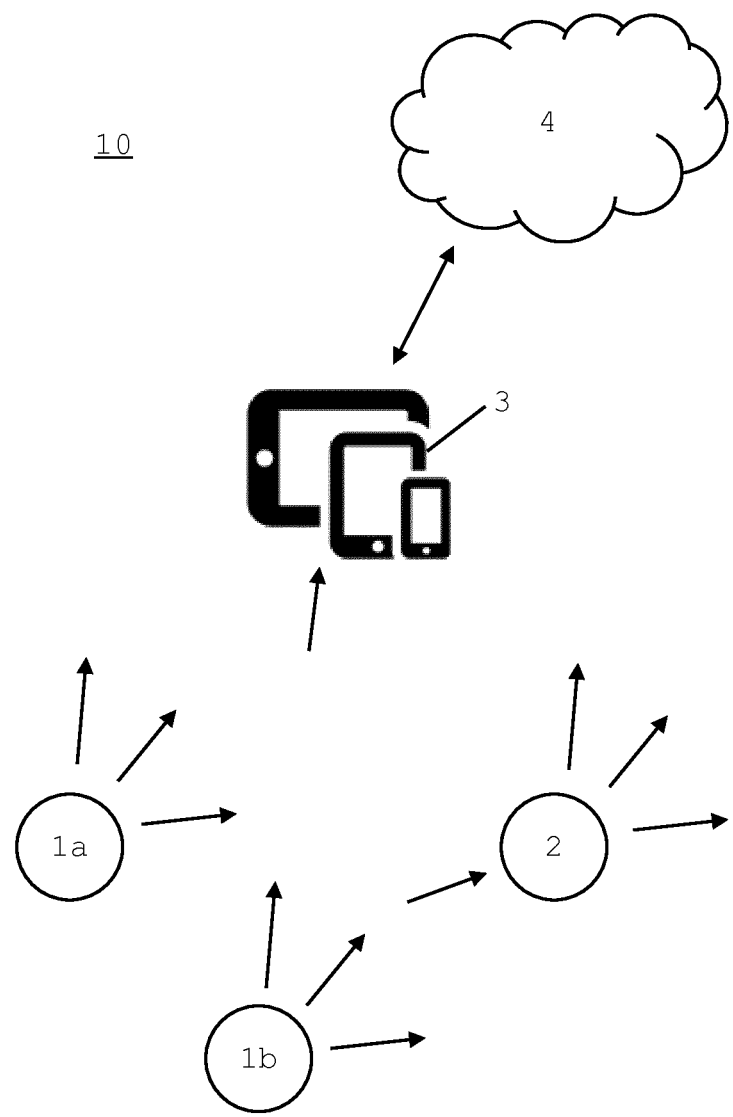
FIG. 1 shows a broadcast network.
Figure 6:
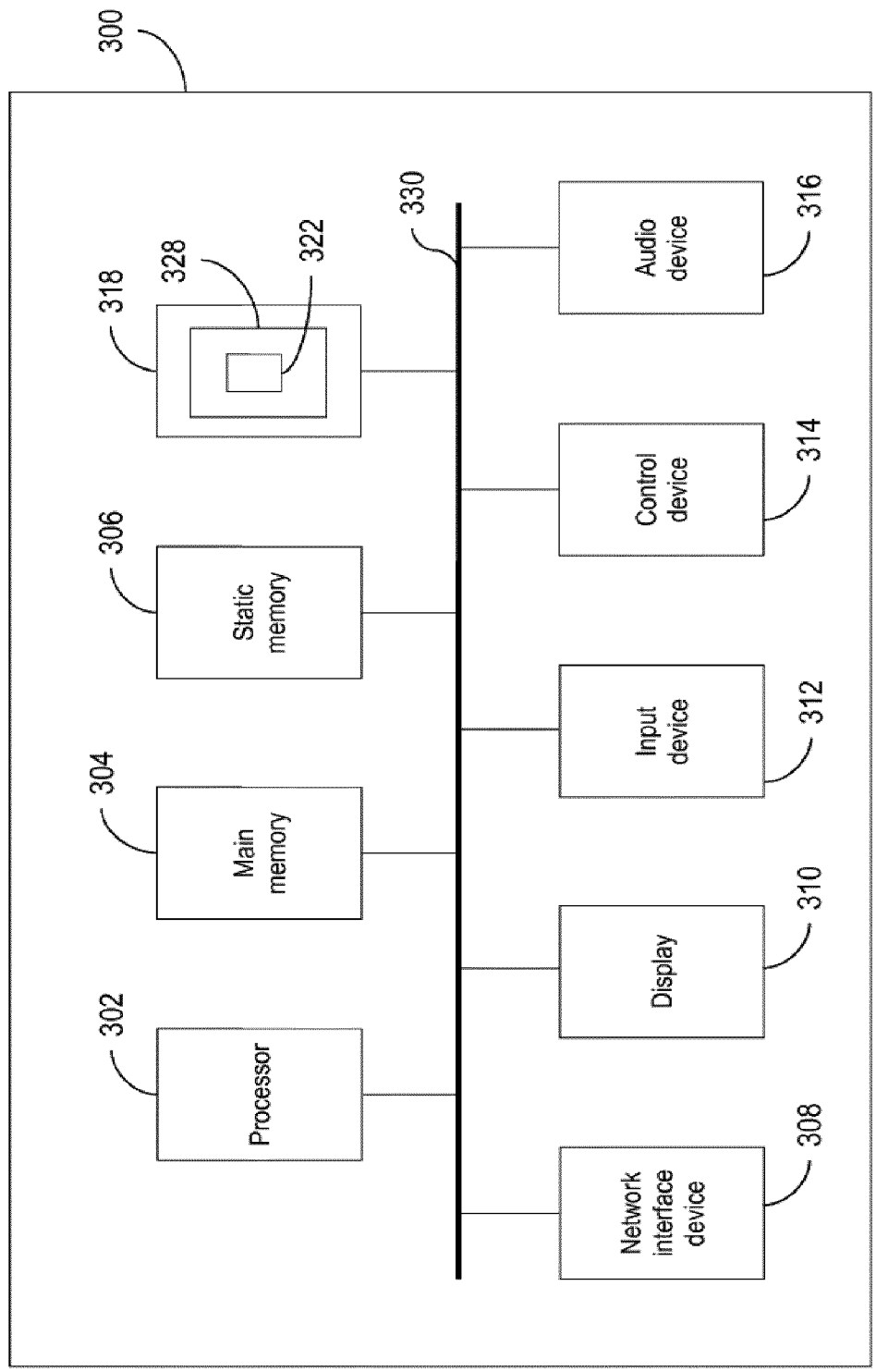
FIG. 6 illustrates a block diagram of one implementation of a computing device.

FIG. 6 illustrates a block diagram of one implementation of a computing device 300 within which a set of instructions, for causing the computing device to perform any one or more of the methodologies discussed herein, may be executed. The computing device 300 may be used for elements of the system shown in FIG. 1.

In alternative implementations, the computing device may be connected (e.g., networked) to other machines in a Local Area Network (LAN), an intranet, an extranet, or the Internet. The computing device may operate in the capacity of a server or a client machine in a client server network environment, or as a peer machine in a peer-to-peer (or distributed) network environment.

The computing device may be a personal computer (PC), a tablet computer, a set-top box (STB), a wearable computing device, a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory (e.g., a data storage device 318), which communicate with each other via a bus 330.

Processing device 302 represents one or more general-purpose processors such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the processing logic (instructions 322) for performing the operations and steps discussed herein.

The computing device 300 may further include a network interface device 308. The computing device 300 also may include a video display unit 310 (e.g., a liquid crystal display (LCD) or a cathode ray tube (CRT)), an alphanumeric input device 312 (e.g., a keyboard or touchscreen), a cursor control device 314 (e.g., a mouse or touchscreen), and an audio device 316 (e.g., a speaker).

The data storage device 318 may include one or more machine-readable storage media (or more specifically one or more non-transitory computer-readable storage media 328) on which is stored one or more sets of instructions 322 embodying any one or more of the methodologies or functions described herein. The instructions 322 may also reside, completely or at least partially, within the main memory 304 and/or within the processing device 302 during execution thereof by the computing device 300, the main memory 304 and the processing device 302 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein (for example control unit 310 in relation to FIG. 6) can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

The invention claimed is:

1. A computer-implemented method for securing a beacon signal in a network comprising a transmitter for broadcasting the beacon signal and one or more receivers for receiving the beacon signal, wherein the beacon signal comprises a data packet, the data packet including a payload, wherein the payload comprises a first field containing broadcast information from the transmitter, a second field for storing authentication information, and a sequence number field for storing a sequence number, wherein the sequence number is incremented for each new beacon signal transmitted by the transmitter, the method comprising:

computing, using a secret key, a message authentication code over at least a part of the payload;

extracting a predefined number of bytes from the message authentication code to obtain the authentication information, the predefined number of bytes being equal to or less than the length of the second field; and encrypting at least part of the first field using a symmetric cipher which takes as parameter the secret key and a nonce, wherein the nonce is based on the authentication information and the sequence number, the encrypting resulting in an encrypted first field, wherein the resulting secure beacon signal comprises the data packet, wherein the payload comprises the encrypted first field and the second field contains the authentication information.

2. The method according to claim 1, wherein the symmetric cipher is a length-preserving symmetric cipher which takes as parameter the secret key and the nonce.

3. The method according to claim 1, wherein the nonce comprises a concatenation of the authentication information and the sequence number and is padded with zeros such that the nonce has a predetermined length.

4. The method according to claim 1, wherein the data packet further comprises an identification field containing an identifier of the transmitter, and wherein the secret key is associated with the identifier of the transmitter.

5. The method according to claim 1, wherein the data packet is a Bluetooth Low-Energy advertising packet data unit.

6. A computer-implemented method for processing a received secure beacon signal in a network comprising a transmitter for broadcasting the secure beacon signal and one or more receivers for receiving the secure beacon signal, wherein the secure beacon signal comprises a data packet, the data packet including a payload, wherein the payload comprises a first field comprising encrypted broadcast information, a second field containing authentication information, and a sequence number field for storing a sequence number, wherein the sequence number is incremented for each new beacon signal transmitted by the transmitter, the method comprising:

receiving the secure beacon signal in a receiver; and decrypting the encrypted first field using a symmetric cipher which takes as parameter a secret key and a nonce, wherein the nonce is based on the authentication information and the sequence number, the decrypting resulting in a decrypted first field.

7. The method according to claim 6, wherein the symmetric cipher is a length-preserving symmetric cipher which takes as parameter the secret key and the nonce.

8. The method according to claim 6, wherein the nonce comprises a concatenation of the authentication information and the sequence number and is padded with zeros such that the nonce has a predetermined length.

9. The method according to claim 6, wherein the data packet further comprises an identification field containing an identifier of the transmitter, wherein the secret key is associated to the identifier of the transmitter, and wherein the method further comprises obtaining the secret key based on the identifier.

10. A computer-implemented method for processing a received secure beacon signal in a network comprising a transmitter for broadcasting the secure beacon signal and one or more receivers for receiving the secure beacon signal, wherein the secure beacon signal comprises a data packet, the data packet including a payload, wherein the payload comprises a first field comprising encrypted broadcast information and a second field containing authentication information, the method comprising:

receiving the secure beacon signal in a receiver;

decrypting the encrypted first field using a symmetric cipher which takes as parameter a secret key and a nonce, wherein the nonce comprises the authentication information, the decrypting resulting in a decrypted first field;

computing a message authentication code over at least a part of the payload after decrypting, and using the secret key;

extracting a predefined number of bytes from the message authentication code to obtain further authentication information, the predefined number of bytes being equal to or less than the length of the second field; and comparing the further authentication information with the authentication information to verify an authenticity of the data packet.

11. The method according to claim 10, wherein the second field is set to a predetermined value other than the authentication information before computing the message authentication code, the predetermined value preferably being zero.

12. The method according to claim 6, wherein the data packet is a Bluetooth Low-Energy advertising packet data unit.

13. A transmitter configured for securing a beacon signal, wherein the transmitter comprises:

a processor configured to perform the method of claim 1; and an antenna for broadcasting the secure beacon signal to one or more receivers.

14. A receiver configured for processing a received secure beacon signal, wherein the receiver comprises:

an antenna for receiving the secure beacon signal broadcast from a transmitter; and a processor configured to perform the method of claim 6.

* * * * *